Patented May 3, 1927.

1,627,278

UNITED STATES PATENT OFFICE.

BRADLEY DEWEY, OF CAMBRIDGE, MASSACHUSETTS, ASSIGNOR TO DEWEY AND ALMY CHEMICAL COMPANY, OF CAMBRIDGE, MASSACHUSETTS, A CORPORATION OF MASSACHUSETTS.

COLLOIDAL ADHESIVE COMPOSITION.

No Drawing. Application filed November 14, 1924. Serial No. 749,998.

This invention relates to adhesive emulsions or the like; an object of this invention is to provide colloidal substances, emulsions and the like, wherein the ultimately adhesive particles in internal or disperse phase shall be physically sub-divided or extended, preferably without chemical disintegration or cleavage of the ultimate characteristic molecular constitution thereof, and wherein the inherent natural adhesive properties of such substances may be rendered more useful by reducing the cohesiveness of the particles among themselves.

It is also an object of the invention to provide a composition wherein the inherent adhesive qualities of the colloidal substance are developed to a maximum degree of practical usefulness, with corresponding economies of the amounts required.

The invention is characterized by a treatment of a closely associated aggregate of particles with an extending colloid preferably in the presence of a liquid in which both the particles and the extending colloid are freely miscible.

As typical examples of substances, which exemplify the invention, may be cited rubber latex and a colloidal earth, such as bentonite clay.

With rubber latex, which may be defined as a water emulsion of natural or synthetic origin, of rubber globules, it may be readily observed that a considerable portion of such globules possesses appreciable adhesiveness while wet and of moderate concentration, but that this property is substantially restrained or overcome by dilution.

This is due in part to the inevitable effect of dilution but perhaps more to absorption of the discrete particles when distributed over a slightly porous surface. For example, ordinary natural latex containing approximately 35% of rubber substance may serve as an adhesive for such purposes as the attaching of labels, but the fact that ordinary naphtha or benzol cements containing approximately 5 or 6% of rubber serve this purpose indicates that higher concentrations of rubber are not necessary. However, if rubber latex is diluted to a rubber content of such small proportion the discrete particles appear to penetrate or to be absorbed by any slightly porous surface thus nullifying the adhesive properties of the particles.

On the other hand, a rubber emulsion containing approximately 35% of rubber is expensive and furthermore, because of the cohesive nature of the particles between themselves, when dried, the effectiveness of their adhesive properties for many purposes is materially impaired. For example, when labelling tin cans with latex the cohesion of the particles among themselves is greater than their adhesion to the tin plate and consequently it is often easy to strip the label from the can. This is particularly true if there is a thin film of oil on the tin plate.

Whatever the theoretical or precise explanation, however, the empirically observed characteristics of latex are those of a liquid having extremely minute particles or globules of rubber substance uniformly dispersed therethrough which are inherently adhesive and which upon evaporation or chemical treatment agglomerate into a cohesive mass of marked tensile strength and elasticity, and essentially homogeneous in structure.

Bentonite, which is a naturally occurring clay and exhibits to an optimum degree the characteristics desirable in the extending or dispersing mediums suitable to be used in the invention, is a finely divided colloidal earth capable of existing as a powder in moist air but evidencing an extreme avidity for water when contacted therewith in liquid phase, with concurrent conversion to a fluid colloidal gel. Such conversion is probably due to adsorption of the water by the clay particles, or vice versa, but actual chemical hydration may also occur simultaneously. The resulting gel occupies many times the volume of the original powder and exhibits a relatively high degree of plasticity, with plastic flow taking place under a slight superimposed pressure. It is homogeneous and freely miscible in large proportions with water, though with eventual separation into a heavier portion which precipitates and an apparently permanent colloidal suspension. It is further characterized by its facility of wetting and spreading or flowing freely upon surfaces to which it may be applied, without substantial pressure being required and without interruption of its continuity, even in thin films.

As a specific and typical example of the invention, the treatment of rubber latex emulsion with bentonite clay, in the presence of water, will be now described.

A water emulsion of uncoagulated rubber, such as natural rubber latex from the rubber tree, and ordinarily containing 35% more or less of rubber solids is found to be suitable for this purpose. This may contain a relatively high proportion of solids to facilitate shipment by a reduction of unnecessary weight and bulk, but may be diluted with water to the degree desired.

A colloidal suspension of bentonite in water is also prepared as by adding the bentonite to water with continuous agitation.

The colloidal gel thus prepared is thoroughly mixed with the desired quantity of rubber latex. The relative proportions of the ingredients, colloidal earth (bentonite) and rubber in water emulsion (latex) while susceptible of variation are to be such that the latex particles, ultimately depended on for adhesive purposes, are dispersed through a predominant quantity of bentonite—which when dry is not at all adhesive. Of the two, bentonite is the continuous and latex the occasional substance, though the latter, by reason of its subdivision is of frequent occurrence in the composition. Both are extended in the fluid medium (water) so that an easily applicable material is provided, capable of being thinly spread, leaving when the water has evaporated a film predominantly composed of bentonite and having adhesive latex particles scattered through it.

The order or condition in which the several elements are combined may be modified in accordance with conditions of transportation and practice. In the event that a paste-like consistency is desired, for example, the following quantities have proven especially satisfactory:

18 lbs. bentonite 100 lbs. water, 10 lbs. of 35% rubber latex emulsion.

The recommended manner of combination is, first, to soak the bentonite in the water for a time sufficient to produce a paste of uniform consistency, and then to stir the paste and latex emulsion together.

The precise mechanism of the association of the two substances obviously does not lend itself to exact determination and can not therefore be described nor defined with conclusive accuracy. The characteristics of the resulting composition, however, indicate that the latex globules have become uniformly extended or disseminated throughout the fluid colloid medium and that they are carried with it, without segregation, even when spread into extremely thin films and the like. Although the mixture so produced does not exhibit a marked degree of adhesiveness, while in the wet or fluid condition, it develops an effective adhesion in the course of drying, which is especially manifest in thin films.

The composition thus produced possesses the general outstanding qualifications of pastes, and is especially suitable as an adhesive between smooth surfaces such as metals, glass finished wood and the like, as well as paper, smooth-finished cloth, leather, etc. Consequently it finds an extensive and peculiarly appropriate application in fixing labels and the like to metal and glass surfaces, though it is adapted for other uses also.

The paste is capable of extension to extremely thin films which are nevertheless strongly adhesive. Accordingly a small amount only is required. But what is of greater importance, the thin film is spread readily and uniformly and subsequently dries rapidly. On the other hand, while in relatively thick volumes, the contained moisture does not evaporate rapidly and consequently does not deteriorate during the normal period of application.

The adhesive qualities of such a preparation are made available to the fullest extent through the action of various phenomena. In the first place the suspended bentonite raises the plasticity of the paste to such a point that no appreciable amount of rubber is removed from its sphere of action on a surface by absorption or by penetration. Secondly, in the dried mass the bentonite serves to keep apart the individual discrete particles of rubber and to allow them to exert their adhesive action without cohering sufficiently to promote stripping, and thirdly it is thought that the bentonite, due to its highly absorptive characteristics tends to remove by blotting action some of the greasy film often found on tin plate thus promoting adhesion of the adhesive to the tinned surface.

The voluminous character of the colloid described makes possible an extremely wide dissemination of the latex particles therethrough, the retention of such spaced relation while the composition is in its fluid condition, and a considerable reduction in volume or area, upon complete evaporation of the liquid medium in which it is carried. Consequently, wide limits of dispersion are possible though preferred ranges will be selectively determined by the properties of the materials used and the conditions under which the product is to be employed.

Should it be necessary or desirable to add a preservative to the adhesive composition, the following formula will prove effective:

½ fluid ounce chloroform, 5 fluid ounces toluol, 5 fluid ounces oil of cloves.

The oil of cloves serves predominantly as a masking odor, though it possesses preservative qualities also.

With the addition of such preservatives or others which may be found to be equivalents therefor, the composition while not otherwise affected, may be prepared in quantity and stored or shipped great distances without deterioration and without putrefaction, even after the container has been opened repeatedly during use.

I claim:

1. An adhesive composition comprising colloidal clay in suspension and rubber in emulsion in water, the colloidal clay predominating substantially in quantity over the rubber.

2. An adhesive composition comprising bentonite and latex, both extended in water, the bentonite predominating substantially in quantity over the latex.

Signed by me at Boston, Massachusetts, this 13th day of November, 1924.

BRADLEY DEWEY.